UNITED STATES PATENT OFFICE.

LYSIAS SMITH, OF BALTIMORE, MARYLAND.

IMPROVED COMPOSITION FOR PRESERVING FRUIT-TREES.

Specification forming part of Letters Patent No. 45,441, dated December 13, 1864.

*To all whom it may concern:*

Be it known that I, LYSIAS SMITH, of the city and county of Baltimore, and State of Maryland, have invented or discovered a new and useful Improvement in Preventing the Ravages of Insects upon Fruit and other Trees; and I do hereby declare the following to be a full, clear, and exact description of the same.

The insects most destructive to the peach-tree are those that attack the roots and draw from them the sustenance of the tree. The object and purpose of my invention is to prevent these insects from their ravages, and I accomplish it as follows:

I first prepare a mixture which I term "black sulphur." It is composed of the following ingredients, and the proportions herein stated I find to answer a good purpose—viz., of sulphur, from three to five ounces; of quicksilver, one ounce; of black antimony, one ounce. These ingredients are well mixed, and for the purposes of convenient use are placed in a dredging-box or other suitable holder, from which they can be readily distributed. I open the earth around the roots, near to the trunk of the tree, or where the insects most generally attack the tree, and, having sifted upon a woolen or other cloth some of the mixture above named, wrap it around the root, and, when wrapped, leaving the edge nearest the trunk somewhat loose, and projecting, for convenience, a little above the surface of the soil. I then dust into the ends of the fold or wrapper a little more of the mixture, and afterward or before fill in the earth around and over the root and wrapping. The insects, whether from the tree or around it, will not attack the roots through this composition, and a full and fair test proves that it is a complete protection against the insects that are so destructive to fruit-trees.

I mention woolen cloth or rags as a wrapping because such rags are much the cheapest. Other wrappings will answer the purpose as well.

I have given the proportions of ingredients that answer the purpose. They may, however, be varied, but not to advantage.

I call the composition "black sulphur" for a name only.

Having thus fully described my invention, what I claim therein as new, and desire to secure by Letters Patent, is—

1. The use of the within-described composition for preventing the ravages of insects upon fruit or other trees, as described.

2. The application of the composition above named to the roots of trees by or through the intervention of a cloth or wrapping around the roots of the trees, and at or near the surface of the surrounding soil, substantially as and for the purpose herein described.

LYSIAS SMITH.

Witnesses:
   A. B. STOUGHTON,
   HAVER FENDRICH.